(12) United States Patent  
Shkondin

(10) Patent No.: US 7,119,468 B2  
(45) Date of Patent: Oct. 10, 2006

(54) ELECTRIC MOTOR

(75) Inventor: Vasily Vasilievich Shkondin, Moscow (RU)

(73) Assignee: Ultra Motor Company Limited, Liverpool (GB)

( * ) Notice: Subject to any disclaimer, the term of this patent is extended or adjusted under 35 U.S.C. 154(b) by 0 days.

(21) Appl. No.: 10/933,676

(22) Filed: Sep. 3, 2004

(65) Prior Publication Data

US 2005/0110365 A1 May 26, 2005

Related U.S. Application Data

(60) Provisional application No. 60/513,911, filed on Oct. 23, 2003.

(30) Foreign Application Priority Data

Sep. 4, 2003 (RU) .............................. 2003126931

(51) Int. Cl.
*H02K 16/02* (2006.01)

(52) U.S. Cl. ................. 310/114; 310/156.01; 310/233; 310/266

(58) Field of Classification Search ............ 310/156.01
See application file for complete search history.

(56) References Cited

U.S. PATENT DOCUMENTS

| 4,190,779 | A | 2/1980 | Schaeffer |
| 5,164,623 | A | 11/1992 | Shkondin |
| 5,345,133 | A * | 9/1994 | Satake ................. 310/266 |
| 5,783,893 | A * | 7/1998 | Dade et al. ............ 310/266 |
| 6,384,496 | B1 | 5/2002 | Pyntikov et al. |
| 6,459,185 | B1 * | 10/2002 | Ehrhart et al. ......... 310/156.45 |
| 6,492,756 | B1 | 12/2002 | Maslov et al. |
| 6,710,492 | B1 * | 3/2004 | Minagawa ............. 310/113 |

FOREIGN PATENT DOCUMENTS

| CA | 2072759 | | 1/1992 |
| CN | 1082262 | * | 2/1994 |
| DE | 19753916 | | 6/1999 |
| EP | 0463168 | | 1/1992 |
| EP | 0507967 | | 5/1992 |
| EP | 0433479 | | 9/1995 |
| GB | 2149226 | | 6/1985 |
| RU | 2035115 | | 5/1995 |
| RU | 2038985 | | 7/1995 |
| RU | 2129965 | | 5/1999 |
| SU | 628008 | | 10/1978 |
| SU | 910480 | | 3/1982 |
| SU | 1220065 | | 3/1986 |
| SU | 1725780 | | 4/1992 |
| WO | WO 91/00220 | | 1/1991 |

* cited by examiner

*Primary Examiner*—Burton Mullins
(74) *Attorney, Agent, or Firm*—Garvey, Smith, Nehrbass & North, L.L.C.; Seth M. Nehrbass; Brett A. North

(57) ABSTRACT

An electric motor intended for driving transport vehicles without a reduction gear is described. The electric motor can have an annular magnetic conductor of the stator with permanent magnets located on opposite sides of the magnetic conductor, and a two-section rotor, one section of which goes round the stator, while the other is inside it. The electric motor provides greater torque.

4 Claims, 2 Drawing Sheets

ELECTRIC MOTOR

CROSS-REFERENCE TO RELATED APPLICATIONS

Incorporated herein by reference is my Russian Patent Application No. 2003126931, filed 4 Sep. 2003.

Incorporated herein by reference is my U.S. Provisional Patent Application No. 60/513,911, filed 23 Oct. 2003.

Priority is hereby claimed to Russian Patent Application No. 2003126931, filed 4 Sep. 2003.

Priority is hereby claimed to U.S. Provisional Patent Application No. 60/513,911, filed 23 Oct. 2003.

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

1. Field of the Invention

The invention relates to electric motors, primarily for vehicles, in the form of motor-wheels, and is intended for use in electrically propelled bicycles, wheelchairs, workshop machinery, electric cars and other vehicles and machines.

2. General Background of the Invention

Collector motor-wheels with no reduction gear, in which the rotation of the wheel is brought about directly by the electromagnetic interaction of a magnetic stator-and-rotor system, are known (SU 628008A[15 Oct. 1978]; SU 910480A[07 Mar. 1982]; SU 1725780A3 [07 Apr. 1992]; U.S. Pat. No. 5,164,623; U.S. Pat. No. 6,492,756). Each of these items are incorporated herein by reference.

One of the main problems facing developers of electric motors of this type is to increase torque without significantly increasing the power (in particular, the voltage) of the supply source.

One possible way to solve this problem is multiplication—increasing the number of components of the electric motor (permanent magnets and electromagnets). This was the approach taken by the author of the invention patented as Russian Federation patent No. 2129965. In the electric motor described in this patent, the permanent magnets are fixed to the annular magnetic conductor of the stator in two parallel rows, polarity alternation being longitudinal (magnets in one line) and transverse (adjacent magnets of different rows have opposite polarity). Each of the two rows of permanent magnets has a corresponding rotor section with electromagnets facing the permanent magnets of the stator in "their own" row. The electric motor could be described as having two stators with a common magnetic conductor and two rotors (also with a common magnetic conductor).

BRIEF SUMMARY OF THE INVENTION

The present invention applies the same principle, but by a different arrangement, which gives the electric motor certain advantages both in its consumer characteristics (such as a further increase of torque due to reduction of magnetic resistance), and also because of the reduction in longitudinal dimensions of the motor, which is particularly important for motors of the "motor-wheel" type.

In one embodiment there is provided an electric motor, primarily for transport vehicles, comprising:

a stator with an annular magnetic conductor having an external and an internal circumferential surface and an axis, a first set of permanent magnets being mounted symmetrically and with alternating polarity round the external circumference of the magnetic conductor, and a second set of permanent magnets being mounted symmetrically and with alternating polarity round the internal circumference of the magnetic conductor, the first and second sets of permanent magnets being arranged pairwise and opposed to each other with opposite polarity in a direction through a thickness of the annular magnetic conductor;

a rotor consisting of first and second sections, the first section being external, passing round the said stator, and the second section being internal, located inside the stator, each of the sections carrying equal numbers of electromagnets facing the permanent magnets of the stator, and both sections having a common geometrical axis with the axis of the annular magnetic conductor of the stator;

a collector-type current distributor having current-conducting plates located thereabout and separated by dielectric gaps, the plates being connected to a direct current supply so as to have alternating polarity; and current collectors mounted so as to contact the plates of the collector-type distributor, the current collector being connected to windings of the electromagnets on the rotor.

Advantageously, the electromagnets of the rotor sections can be located co-axially relative to each other, with their windings connected in pairs to the corresponding current collectors, the number of current-collector plates of the distributor-type collector being equal to the number of pairs of permanent magnets of the stator; and the axial lines of the dielectric gaps between the plates being aligned along the axial lines of the permanent magnets of the stator.

The current collectors may be mounted on the internal rotor section in such a manner that they can be displaced round the circumference relative to the current distributor.

Unlike the aforementioned patent, the electric motor described in the present patent application can achieve this by having the two rows of permanent magnets located not on the same side, but on opposite sides of the annular magnetic conductor, opposite each other; and the adjacent magnets set opposite each other are of opposite polarity.

The two sections of the rotor can also be disposed differently: one of them, the external one, goes round the stator (annular magnetic conductor with permanent magnets), and the other inner one is inside the stator. The stator and the two rotor sections have a common geometrical axis. The two sections have the same number of electromagnets, disposed symmetrically round the circumference, the electromagnets of the external section of the rotor being located opposite the corresponding electromagnets of the internal section (i.e., the axes of each pair of electromagnets of the two sections lie in the same diametrical plane). The electromagnet coils of the internal and external sections of the rotor are connected in pairs to the current collectors, while observing the condition of equality of the number of current collector plates of the distribution collector and the number of pairs of permanent magnets of the stator; and the collector must be mounted so that the axial lines of the dielectric gaps between the current collector plates of the collector are aligned along the axial lines of the permanent magnets of the stator.

In one embodiment preferably the electromagnets of the rotor sections can be located co-axially relative to each other, with their windings connected in pairs to the corresponding current collectors, while the number of current-collector plates of the distributor-type collector is equal to the number of pairs of permanent magnets of the stator; and the axial lines of the dielectric gaps between these plates are aligned along the axial lines of the permanent magnets of the stator.

In one embodiment preferably the current collectors can be mounted on the internal rotor in such a manner that they can be displaced round the circumference relative to the current distributor.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
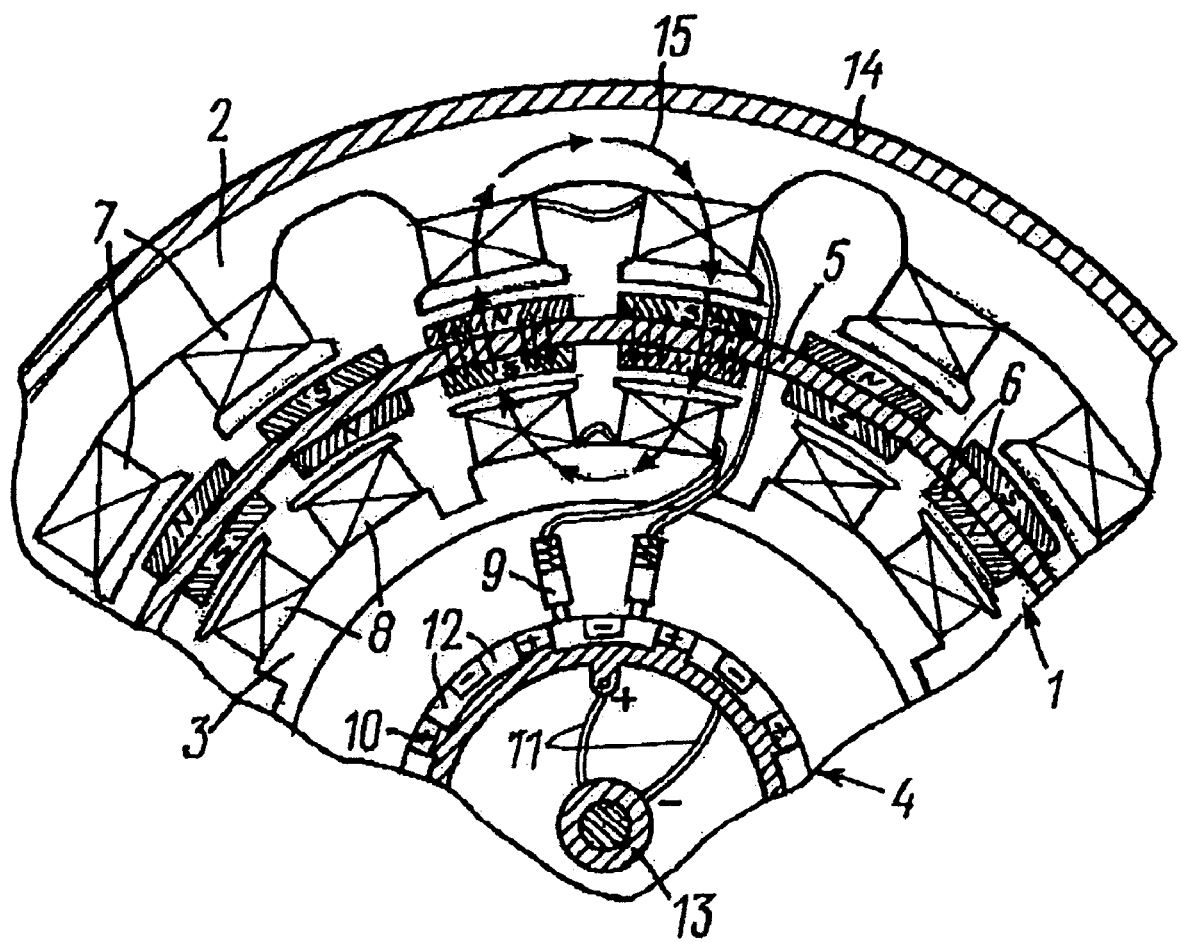
FIG. 1 shows a partial transverse section of the electric motor.
Figure 2:
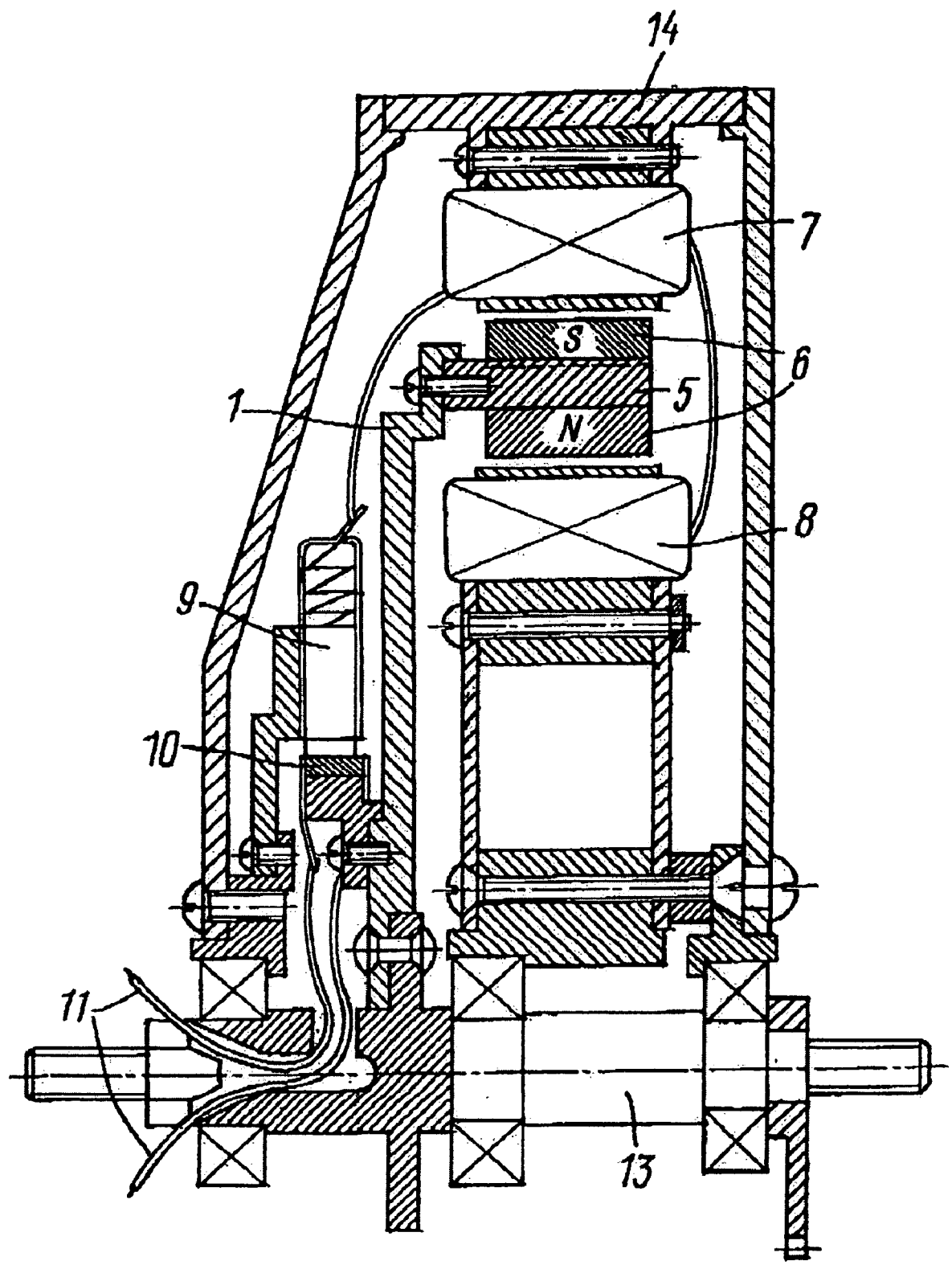
FIG. 2 shows a partial longitudinal section of the electric motor.

The electric motor consists of a stator (1), external (2) and internal (3) sections of the rotor, and a distributor (collector) (4).

For its part, the stator consists of an annular magnetic conductor (5) and permanent magnets (6) placed on it on both sides, opposite each other. The magnets have alternating polarity relative to the adjacent electromagnets in the row (located on the same side of the magnetic conductor) and opposite polarity of the magnets on the two sides of the magnetic conductor opposite each other. The external (2) and internal (3) sections of the rotor carry electromagnets (7 and 8 respectively). These electromagnets face each other, and each facing pair of electromagnets is located co-axially, in the same diametrical plane. Adjacent electromagnets in the rotor sections are connected in pairs to the current collectors (9). These can be displaced round the distributor for possible adjustment of the electric motor.

The cylindrical collector (4) has a number of current-conducting plates (10), which are connected with alternating polarity by busbars to a direct current supply (not shown) by wires (11). The plates are separated from each other by dielectric gaps (12). The axial lines of the dielectric gaps (12) are aligned along the axial lines of the permanent magnets (6) of the stator, and the total number of current-conducting plates is equal to the number of pairs of these magnets.

The principle of operation of the motor is no different from the known ones and requires no explanation. When the motor is connected up to a supply source, the rotor rotates round its axis (13). Transmission of torque in the "motor-wheel" variant may be achieved, in particular, through a shell (14) connected to the wheel.

Due to the placing of the stator magnets and the rotor section electromagnets in accordance with the invention, the electromagnetic flux (15) does not close in the narrow gap of the magnetic conductor of the stator, but passes along a theoretical toroidal shape formed by the cores of two pairs of electromagnets of the rotor section; the placing of the permanent magnets on opposite sides of the magnetic conductor of the stator also facilitates the passage of magnetic flux during recommutations of the of the electromagnets.

Tests have shown that an electric motor made in accordance with the invention is capable of developing torque from 300 to 800 Nm at comparatively low power (3–5 kW). A specimen motor of 5 kW power with a diameter of 395 mm and weighing 24 kg developed torque of about 600 Nm at a voltage of 48 V.

All measurements disclosed herein are at standard temperature and pressure, at sea level on Earth, unless indicated otherwise.

The preferred features of the invention are applicable to all aspects of the invention and may be used in any possible combination.

Throughout the description and claims of this specification, the words "comprise" and "contain" and variations of the words, for example "comprising" and "comprises", mean "including but not limited to", and are not intended to (and do not) exclude other components, integers, moieties, additives or steps. The foregoing embodiments are presented by way of example only; the scope of the present invention is to be limited only by the claims which issue in patents claiming priority of this patent application.

The invention claimed is:

1. An electric motor, primarily for transport vehicles, comprising:
   (a) a stator with an annular magnetic conductor having an external and an internal circumferential surface and an axis;
   (b) a first set of permanent magnets being mounted symmetrically and with alternating polarity round the external circumference of the magnetic conductor, and
   (c) a second set of permanent magnets being mounted symmetrically and with alternating polarity round the internal circumference of the magnetic conductor,
   (d) the first and second sets of permanent magnets being arranged pairwise and opposed to each other with opposite polarity in a direction through a thickness of the annular magnetic conductor;
   (e) a rotor consisting of first and second sections, the first section being external, passing round the said stator, and the second section being internal, located inside the stator, each of the sections carrying equal numbers of electromagnets facing the permanent magnets of the stator, and both sections having a common geometrical axis with the axis of the annular magnetic conductor of the stator;
   (f) a collector-type current distributor having current-conducting plates located thereabout and separated by dielectric gaps, the plates being connected to a direct current supply so as to have alternating polarity; and
   (g) current collectors mounted so as to contact the plates of the collector-type distributor, the current collector being connected to windings of the electromagnets on the rotor,
   wherein the current collectors are mounted on the internal rotor section in such a manner that they can be displaced round the circumference relative to the current distributor.

2. The electric motor as claimed in claim 1, wherein the electromagnets of the rotor sections are located co-axially relative to each other, with their windings connected in pairs to the corresponding current collectors, the number of current-conducting plates of the collector-type current distributor being equal to the number of pairs of permanent magnets of the stator; and the axial lines of the dielectric gaps between the plates being aligned along the axial lines of the permanent magnets of the stator.

3. An electric motor, primarily for transport vehicles, comprising:
(a) a stator with an annular magnetic conductor having an external and an internal circumferential surface and an axis;
(b) a first set of permanent magnets being mounted symmetrically and with alternating polarity round the external circumference of the magnetic conductor, and
(c) a second set of permanent magnets being mounted symmetrically and with alternating polarity round the internal circumference of the magnetic conductor,
(d) the first and second sets of permanent magnets being arranged pairwise and opposed to each other with opposite polarity in a direction through a thickness of the annular magnetic conductor;
(e) a rotor consisting of first and second sections, the first section being external, passing round the said stator, and the second section being internal, located inside the stator, each of the sections carrying equal numbers of electromagnets facing the permanent magnets of the stator, and both sections having a common geometrical axis with the axis of the annular magnetic conductor of the stator;
(f) a collector-type current distributor having current-conducting plates located thereabout and separated by dielectric gaps, the plates being connected to a direct current supply so as to have alternating polarity;
(g) current collectors mounted so as to contact the plates of the collector-type distributor, the current collector being connected to windings of the electromagnets on the rotor; and
(h) wherein the electromagnets of the rotor sections are located co-axially relative to each other, with their windings connected in pairs to the corresponding current collectors, the number of current-conducting plates of the collector-type current distributor being equal to the number of pairs of permanent magnets of the stator; and the axial lines of the dielectric gaps between the plates being aligned along the axial lines of the permanent magnets of the stator,
wherein the current collectors are mounted on the internal rotor section in such a manner that they can be displaced round the circumference relative to the current distributor.

4. An electric motor, primarily for transport vehicles, comprising:
(a) a stator with an annular magnetic conductor having an external and an internal circumferential surface and an axis;
(b) a first set of permanent magnets being mounted symmetrically and with alternating polarity round the external circumference of the magnetic conductor, and
(c) a second set of permanent magnets being mounted symmetrically and with alternating polarity round the internal circumference of the magnetic conductor,
(d) the first and second sets of permanent magnets being arranged pairwise and opposed to each other with opposite polarity in a direction through a thickness of the annular magnetic conductor;
(e) a rotor consisting of first and second sections, the first section being external, passing round the said stator, and the second section being internal, located inside the stator, each of the sections carrying equal numbers of electromagnets facing the permanent magnets of the stator, and both sections having a common geometrical axis with the axis of the annular magnetic conductor of the stator;
(f) a collector-type current distributor having current-conducting plates located thereabout and separated by dielectric gaps, the plates being connected to a direct current supply so as to have alternating polarity;
(g) current collectors mounted so as to contact the plates of the collector-type distributor, the current collector being connected to windings of the electromagnets on the rotor; and
(h) wherein the current collectors are mounted on the internal rotor section in such a manner that they can be displaced round the circumference relative to the current distributor.

* * * * *